April 29, 1947. L. SEJARTO 2,419,600
EXPANSIBLE CHAMBER MOTOR OR COMPRESSOR WITH LONGITUDINAL SHAFT
AND ANGULARLY INCLINED PISTONS GEARED THERETO
Filed Dec. 30, 1944 4 Sheets-Sheet 1

Fig.1.

INVENTOR
Lester Sejarto

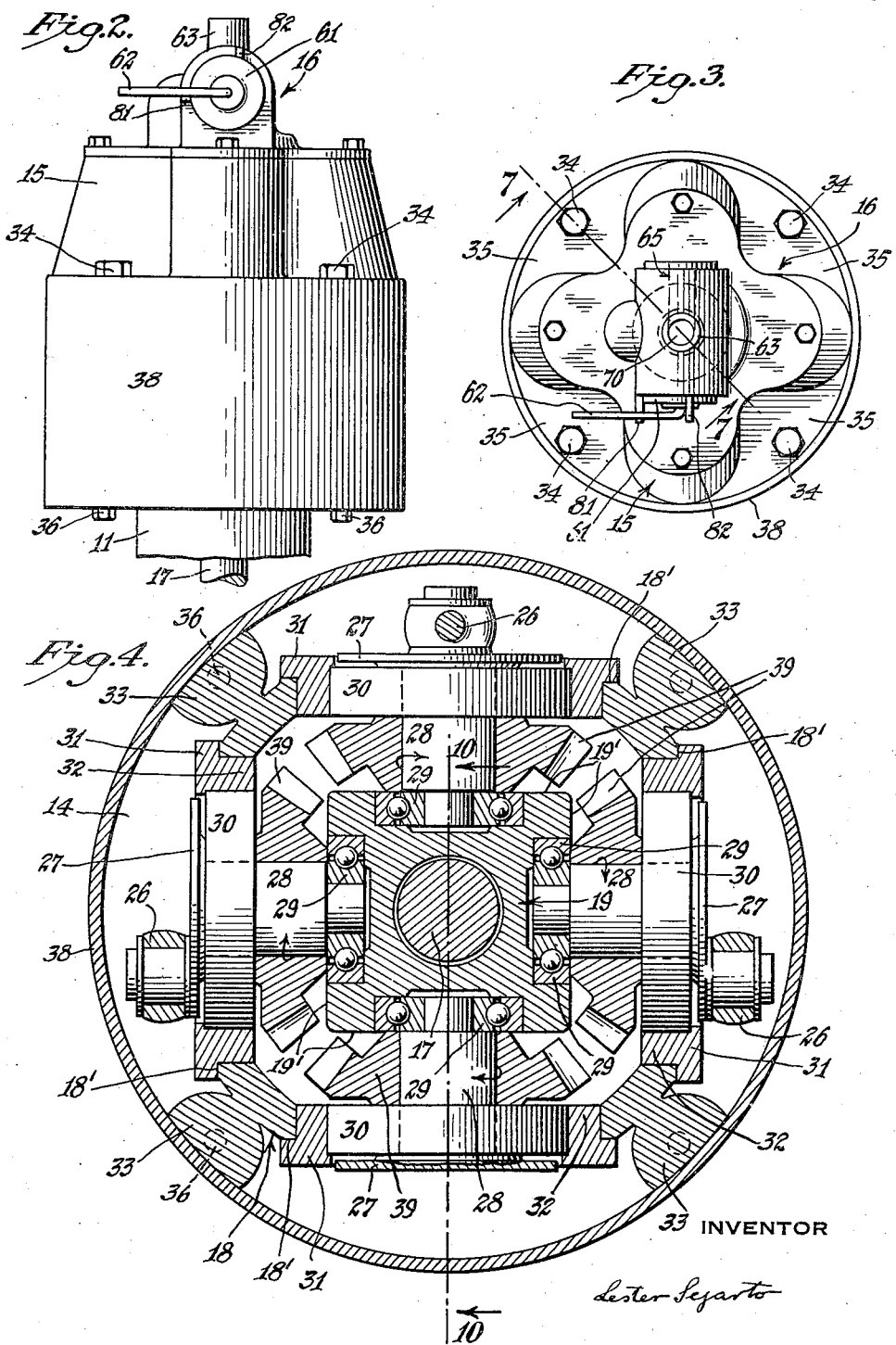

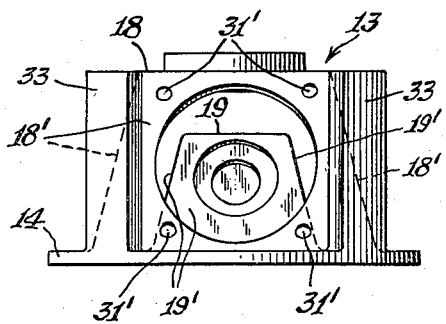
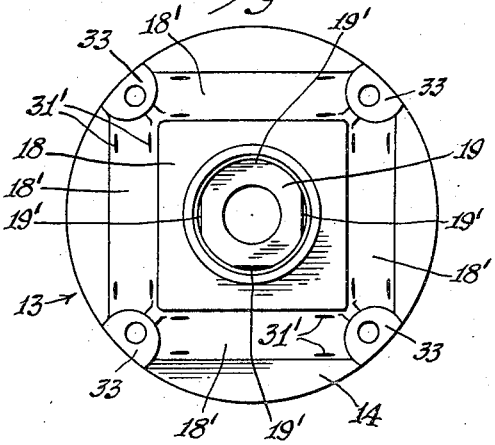
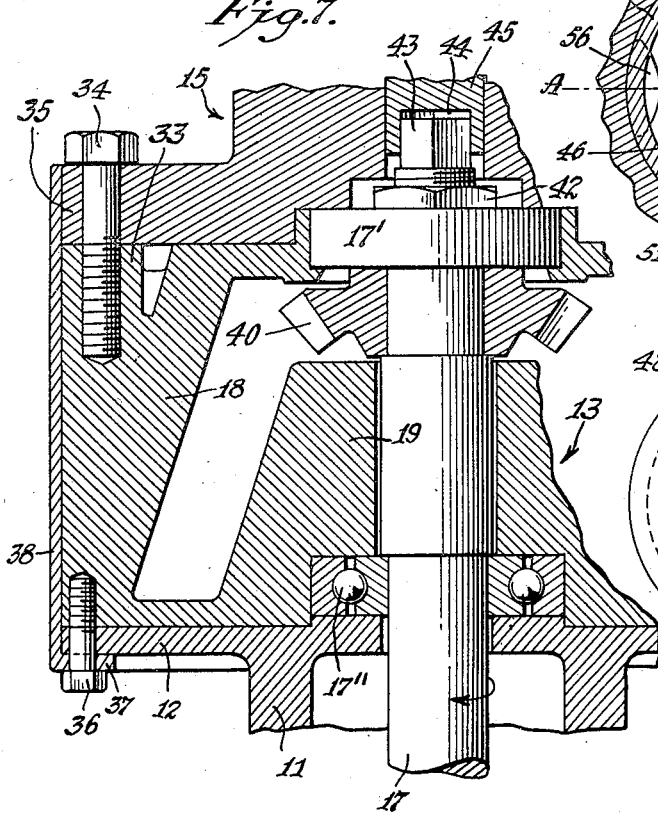
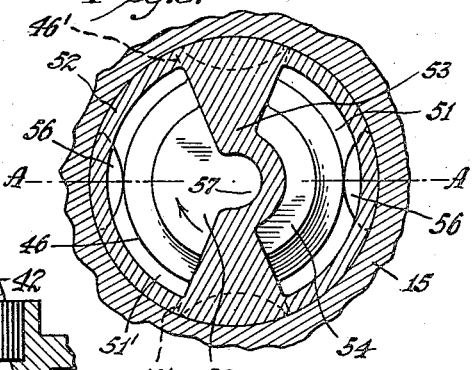
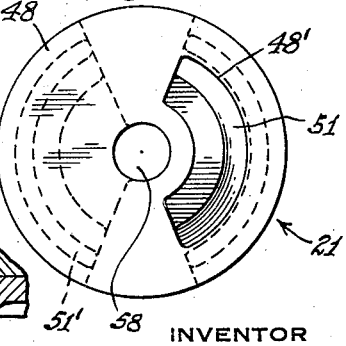

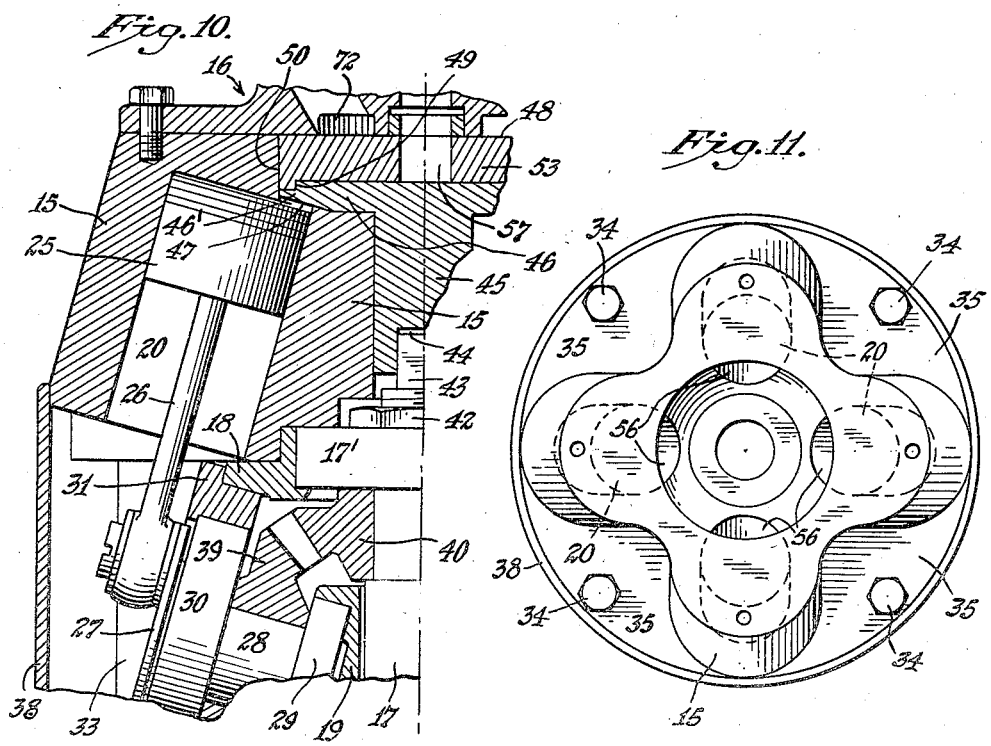
Fig. 10.
Fig. 11.
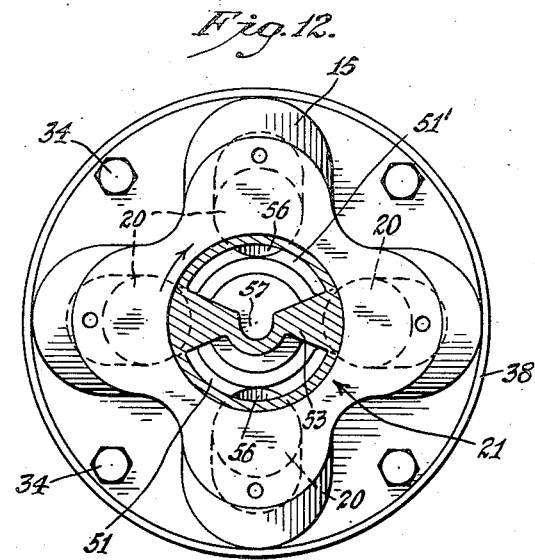
Fig. 12.
INVENTOR
Lester Sejarto

Patented Apr. 29, 1947

2,419,600

UNITED STATES PATENT OFFICE 2,419,600

EXPANSIBLE CHAMBER MOTOR OR COMPRESSOR WITH LONGITUDINAL SHAFT AND ANGULARLY INCLINED PISTONS GEARED THERETO

Lester Sejarto, Richmond Hill, N. Y.

Application December 30, 1944, Serial No. 570,525

11 Claims. (Cl. 121—117)

This invention relates to multiple-cylinder motors of the pressure fluid actuated type. An object of the invention is to provide a motor particularly suitable for operating a machine tool by direct connection to the chuck shaft thereof, or through gearing to the work-feeding spindle of such a machine. Another object of the invention is to provide an improved and simple construction in which the motor will be of extremely compact design, and symmetrical in appearance with freedom from laterally projecting parts.

The invention is particularly applicable to apparatus for transmitting and controlling power such as that shown in my copending application, Serial No. 541,612, filed June 22, 1944, in which a machine tool is driven by a pressure fluid motor which in turn is powered by the output of a compressor, preferably of like construction, driven by an electric motor. In such an apparatus an object of this invention is to provide a superior pressure fluid motor equally adaptable for use as a compressor in the system.

It is desirable that such a motor be comparatively small, light in weight, and not cumbersome, but readily movable with the head of the machine when the latter is manipulated during the performance of work.

A particular advantage of the construction shown and described herein resides in the aforesaid adaptability of the motor for alternate use as a compressor, because of the close grouping of the upper ends of the cylinders around the centrally located rotary timing valve. This arrangement provides close clearance between the top of the cylinders and the valve, with relatively short intervening ports leading to the interior of the valve, and because of the restricted area of such necessary ports and other passageways through the valve, forming the headroom between the cylinders and the inlet and outlet ports of the motor, a resulting desirable increase of efficiency will be obtained and, in the case of use as a motor, a tendency of the cutting tool driven thereby to lag or speedup, when work loads are applied or removed, will be diminished.

Another object of the invention resides in a diagonal arrangement of the cylinders around a central drive shaft, and with their axes diverging downwardly toward individual crank shafts geared to operate the drive shaft, thus providing for spaced bearings to rigidly support the crank shafts, and for proper clearance between adjacent drive gears on the crank shafts, all within the limits of the major diameter of the cylinder block. A further advantage of the aforesaid cylinder arrangement is characterized by a consequent reduction in the diameter of the rotary valve, which not only provides for the desirably smaller internal areas, but affords lessened frictional resistance between contacting surfaces because they are proportionally less extensive.

The invention consists of novel features of construction and parts for carrying out the above objects and advantages as will be more fully described hereinafter and pointed out in the appended claims.

An embodiment of the invention is illustrated in the accompanying drawings forming a part of this specification, and in which drawings—

Fig. 1 is a central vertical section showing the improved motor construction, the plane of the section through the rotary timing valve corresponding to line A—A of Fig. 8.

Fig. 2 is a side elevation of the motor on a reduced scale.

Fig. 3 is a plan view of the same.

Fig. 4 is a horizontal section on the line 4—4 of Fig. 1.

Fig. 5 is a side elevation of a part of the structure utilized for supporting the bearings of the main shaft and crank shafts of the motor.

Fig. 6 is a plan view of the same.

Fig. 7 is a fragmentary detail vertical section on the line 7—7 of Fig. 3.

Fig. 8 is a horizontal detail section on the line 8—8 of Fig. 1.

Fig. 9 is a plan view of the rotary timing valve of the motor.

Fig. 10 is a fragmentary detail vertical section on the line 10—10 of Fig. 4.

Fig. 11 is a plan view of the motor with the head member and valve removed, and, Fig. 12 is a similar view but showing the valve in section and in an advanced position of 90 degrees beyond the position shown in Figs. 1 and 8, and corresponding to that of Fig. 10.

Referring to Fig. 1 of the drawings, the motor 10 consists generally of a hollow supporting sleeve 11 provided at its upper extremity with an annular flange 12; a bearing supporting frame member 13 having an annular base flange 14 secured to flange 12; a cylinder block 15 secured to the top of frame member 13; and a head member 16 secured to the top of block 15.

Sleeve 11 is shown broken away, but it may be suitably fashioned for securing the motor 10 to the movable head of a machine tool equipped with the usual chuck for holding a tool, such as a milling cutter, or otherwise as may be desired. A central drive shaft 17 is journaled in spaced bearings 17' and 17" respectively positioned at the top and bottom of frame member 13. Cylinder block 15 is bored to provide four longitudinally disposed cylinders 20 which are equally spaced apart about the vertical axis of said block, and with their axes inclined so as to converge upwardly toward the rotary valve indicated at 21. Thus the cylinders are substantially longitudinally positioned around said drive shaft and angularly disposed relative thereto.

Frame member 13 (Figs 5 and 6) is of double frusto-pyramidical configuration, and consists of an outer hollow part 18, and a telescoping inner part 19. Each part has four flat sides, designated 18' and 19' respectively, those of one part being parallel with those of the other part, and all lying in planes parallel with the respective axes of the adjacent cylinders 20, as shown in Fig. 1. The pairs of flat inclined sides 18' and 19' are aligned transversely below and opposite associated cylinders.

Within the cylinders are pistons 25, and rods 26 pivotally connect them to crank discs 27 integrally formed on the outer end of crank shafts 28 journaled at their inner ends in bearings 29 mounted in the recessed sides 19' of part 19 of frame member 13. The outer ends of crank shafts 28 are supported in larger main bearings 30 mounted in removable rectangular plates 31 having bosses 32 which extend into the recessed sides 18' of part 18 of frame member 13. The sides 18' are drilled and tapped as at 31' (Figs. 5 and 6) for suitable cap screws, not shown, by means of which the plates 31 may be secured in place.

Frame member 13 has upright columns 33 extending from top to bottom, one at each of the four corners where sides 18' meet, and which are drilled and tapped on top for threaded engagement with bolts 34 provided to secure block 15 to frame member 13. Block 15 is cut away between the cylinders 20 to provide suitable flanges 35 through which bolts 34 pass. Columns 33 likewise serve at their opposite ends for threaded engagement with bolts 36 which secure flanges 12 and 14 together. The bolts 36 first pass through the inturned edge 37 of a cylindrical casing 38 surrounding frame member 13 and the lower edge of block 15, and forming the outer wall of an oil chamber 38' for lubricating purposes.

Each of the crank shafts 28 has a bevel gear 39 keyed or otherwise secured to it between the bearings 29 and 30, and meshing with a similar gear 40 keyed to the upper end of drive shaft 17 directly below bearing 17'. Drive shaft 17 is provided with a shoulder 41 which bears against the hub of gear 40. A nut 42 threaded to the upper end of drive shaft 17 above bearing 17' clamps the inner race of the bearing against the top surface of the gear 40 so that these parts will revolve together when the pistons are reciprocated and gears 39 are rotated. It will accordingly be noted that the transmission means shown is desirably positioned contiguous the drive shaft, or differently stated, between said shaft and the longitudinal axes of the cylinders, which as previously mentioned, are angularly disposed relative to said shaft.

The upper end of shaft 17 is square and fits into a square opening 44 in the lower end of a spindle 45 journaled to rotate in block 15 in alignment with shaft 17. The upper end of spindle 45 is of increased diameter to provide a disc 46 the lower surface of which is flat with an annular beveled edge 47 inclined upwardly at an angle parallel with the top wall of cylinders 20. The said lower surface of disc 46 contacts a complementary supporting surface formed on the bottom of a circular recess 50 in the top of block 15. Disc 46 forms the bottom wall of valve 21, the other part of which consists of a circular lid 48 that fits tightly along opposite portions of its lower outer edge into a rabbet 49 (Fig. 10) formed along oppositely projecting edge portions 46' of disc 46, so that these parts will rotate together when spindle 45 is rotated by drive shaft 17 by reason of the engagement of the square end 43 of shaft 17 with opening 44 of the spindle. Valve 21 is thus rotatably supported on the top of block 15 within recess 50 with the top of lid 48 flush with the top surface of block 15 and also with the lower surface of head member 16, the adjoining cylindrical surfaces being also closely fitted for the purpose of providing snug joints between all contiguous surfaces.

Lid 48 has a cylindrical outer wall 52 (Fig. 8) bridged across by a partition 53 dividing the interior of the valve into two compartments 54 and 55 normally functioning respectively as intake and exhaust passageways for operating the motor 10. The opposite outer edges of disc 46 between said projecting portions are beveled, and coinciding portions of the inner edge of wall 52 are beveled, the said beveled surfaces being spaced apart and providing therebetween, diametrically opposite arcuate slots 51 and 51' which afford passageways respectively between the bottom of recess 50 and compartments 54 and 55. It will be seen that the side walls of slots 51 and 51' are parallel, and because of their inclined walls the said slots are directed towards cylinders 20.

The opposite ends of slots 51 and 51' terminate, as shown in Figs. 8, 9 and 12, at opposite sides of the partition 53, thereby being coextensive respectively with associated compartments 54 and 55. Ports 56 in block 15 lead from the cylinders 20 to the bottom of the recess 50, and are shaped to correspond to the curvature of cylinders 20 at one side, and at their other side to the cylindrical recess 50, best shown in Figs. 11 and 12. When valve 21 rotates, slots 51 and 51' are brought into registration successively with ports 56. The walls of partition 53 diverge outwardly in opposite directions as shown in Figs. 8 and 12, so as to fully cover the ports 56 of diametrically opposite cylinders 20 at such time as associated pistons are at the top or bottom of their stroke (Fig. 12). The central part of the partition 53, between its diverging ends, is arched to provide a semi-circular recess 57 coinciding with a circular port 58 through the lid 48 (Figs. 1 and 9), which is aligned with a port 59 in head member 16 leading to a transverse cylindrical opening 60 through the head member 16 within which there is mounted a rotatable reversing valve core 61 adapted to be oscillated by a handle 62 (Figs. 2 and 3). Head member 16 is provided with an upper terminal stem 63 suitable for the attachment of a hose through which pressure fluid may be introduced to the motor.

Port 59 leads to an exhause port 64 in core 61, and port 64 leads to a transverse port 65 passing through core 61 to atmosphere. An arcuate port 66 is spaced from and extends partially around port 65, and has outlets 67, 68 and 69 spaced part 90 degrees along the circumference of valve core 61. Stem 63 has an opening 70 therethrough leading to the cylindrical opening 60, and head member 16 has a port 71 leading from an annular recess 72, formed in the bottom of head member 16, to the said cylindrical opening 60 at a point spaced 90 degrees from the intersection of port 59 with said opening. Lid 48 has an arcuate slot 48' which corresponds in width to that of the annular recess 72, and is coextensive with compartment 54, so that the latter will always be in communication with port 71 during the rotary movement of valve 21.

As described hereinabove, rotary distributor valve 21 is effectively positioned contiguous the cylinder heads for directly supplying to and exhausting fluid from said cylinders in timed sequence. In normal operation when the apparatus is used as a motor, the fluid supplied will be of the comparatively high pressure type and that exhausted will be comparatively low pressure fluid; however when the apparatus is used as a compressor, the comparatively high pressure fluid will be that which is exhausted, while the fluid which is supplied is of comparatively low pressure. Disposition of the distributor valve is such that the ports and passages thereof are coordinated with the inlet and outlet ports of the cylinders substantially without any intervening conduits. In this connection the cylinders, as a result of their angular disposition, converge toward the rotary valve so that the cylinder head ports cooperate with the appropriate ports of the rotary valve, to thereby substantially obviate the necessity of fluid conduits therebetween, as previously stated. The positioning and arrangement of the reversing valve relative to the rotary valve distributor is adapted to maintain the general structural efficiency of the apparatus, and includes fluid ports, conduits and the like which are directly coordinated with ports and passages of said rotary valve.

It will now be apparent that when a fluid under pressure enters port 70 it will pass through ports 66 and 71 into the annular recess 72, and on around to intake compartment 54 of valve 21. Assuming the movable parts of the motor to be in the position shown in Fig. 1, 4, 8 and 9, fluid from the compartment 54 will pass through port 56 into the cylinder 20 at the right of Fig. 1 forcing the associated piston 25 downwardly as indicated by the arrow. The rotation of the corresponding crank shaft 28, its gear 39, and the gear 40, will effect rotation of drive shaft 17. At the same time, the piston at the left of Fig. 1 will move oppositely by reason of the pivotal connection point of its rod being oppositely operable on crank disc 27, and its gear 39 meshing with gear 40. Fluid in that cylinder will therefore be exhausted through its port 56 into exhaust compartment 55, now in registration therewith, and always in registration with port 59 through port 58 of lid 48. When the reversing valve is in the position shown in Fig. 1, the port 69 then in registration with port 59, and leading to port 65, provides the final outlet exhaust passageway to atmosphere.

It will be understood that the remaining two diametrically opposite pistons are pivoted to their crank discs at intermediate points with one piston all the way up, and the other all the way down, and so that as valve 21 rotates, the projecting edge portions 46' of disc 46, forming a portion of the lower surface or face of valve 21 and which are directly beneath the opposed ends of bridge 53, will successively cover and uncover the various ports 56, followed by the selective registration of compartments 54 and 55 with said ports 56, whereby all the pistons will be operated in orderly sequence, imparting a constant speed to the drive shaft with or without the application of a work load, and which speed may be regulated to any required extent for the machining of various metals, in the manner set forth in the said copending application.

It will be noted that a pressure fluid entering or being exhausted through ports 56, will always enter through port 70 and finally leave through port 65, except in the instance of use of the motor as a compressor with the shaft 17 being driven by other means in an opposite direction to that indicated in Fig. 1. Under such circumstances the output would leave through port 70.

Should it be desired to reverse the motor 10, the handle 62 may be moved a quarter turn clockwise, as viewed in Fig. 2, away from stop 81 and into contact with stop 82. This operation will rotate the valve core 61, changing port 69 into registration with port 71, and outlets 67 and 69 of arcuate port 66 into registration respectively with ports 70 and 59, the outlet 68 then being closed by the walls surrounding the valve core 61. The pressure fluid entering port 70 will now pass through outlet 67 into arcuate port 66, and thence through outlet 69 to port 59 which becomes an inlet instead of an exhaust port as heretofore. Compartment 54 will then be an exhaust instead of an inlet passageway, and compartment 55 will be, instead, an inlet one. Should the movable motor parts be in the position shown in Fig. 1, each of the pistons shown will consequently move oppositely from the forward directions indicated by the respective adjacent arrows.

Various modifications within the scope of the appended claims may be made without departing from the spirit of my invention, and I do not wish to be understood as limiting myself to the exact form and construction shown, as such modifications will readily suggest themselves to those skilled in the art.

I claim:

1. In a pressure fluid actuated motor, the combination comprising a cylinder block having a central longitudinally mounted drive shaft, a plurality of cylinders substantially longitudinally positioned around said drive shaft and angularly disposed relative thereto, pistons reciprocable in said cylinders, transmission means contiguous said drive shaft and in operative association therewith, said pistons being coordinated with said transmission means for actuating the same, said transmission means being positioned between said drive shaft and the longitudinal axes of said cylinders, means for supplying pressure fluid to and exhausting the same from said cylinders and for effecting the reversal of the motor, said means comprising a cylindrical rotary valve mounted in said block for integral movement with said shaft and positioned contiguous the heads of said cylinders for supplying said fluid thereto and exhausting it therefrom, said valve having ports and passageways coordinated with said cylinders for timing the operation of said pistons in an orderly sequence, and a head member for said block having a bore transversely therethrough, a reversing valve rotatably mounted in said bore adjacent said rotary valve, said head member having suitable intake and exhaust ports leading through said reversing valve to and from said rotary valve, said cylinder block having cylinder ports leading directly to said rotary valve, and means for effecting the partial rotation of said reversing valve to cause a transposition of said intake and exhaust ports acting through the rotary valve to reverse the motor.

2. In a pressure fluid actuated motor, the combination of a cylinder block having a plurality of cylinders and pistons reciprocable therein, a cylindrical rotary valve mounted in said block contiguous the heads of the cylinders for directly supplying fluid to and exhausting the same from said cylinders, and adapted for timing the operation of said pistons in predetermined sequence, a head member mounted on said cylinder block having a bore transversely therethrough, a motor reversing valve mounted in said bore adjacent said rotary valve, said head member having intake and exhaust ports and passages leading through said reversing valve to said rotary valve, said cylinder block having cylinder ports adapted for direct coordination with said rotary valve, said reversing valve being adapted for rotation to effect a transposition of said intake and exhaust ports acting through the rotary valve to reverse the motor, a bearing supporting frame member upon which said block is mounted including means adapted for supporting said motor, a central longitudinal drive shaft journaled in alignment with the axis of said rotary valve in bearings carried by said frame member at opposite ends thereof, and operatively adapted to actuate said rotary valve, a crank shaft for each piston operatively connected for rotation thereby, said crank shafts being journaled respectively in bearings carried by said frame member, said cylinders being substantially longitudinally positioned and angularly disposed relative to said drive shaft and said crank shafts being radially disposed around the axis of said drive shaft, driving gears respectively mounted on said crank shafts contiguous said drive shaft and commonly meshing with a gear mounted on said drive shaft, whereby a constant speed will be imparted to the drive shaft of the motor.

3. In a pressure fluid actuated motor, the combination of a plurality of cylinders and pistons reciprocable therein, a cylindrical rotary valve mounted contiguous the heads of the cylinders for directly supplying fluid to and exhausting the same from said cylinders, and adapted for timing the operation of said pistons in predetermined sequence, a head member in superimposed relationship to said rotary valve having a bore transversely therethrough, a reversing valve rotatably mounted in said bore adjacent said rotary valve, said head member having suitable intake and exhaust ports leading through said reversing valve and coordinated with ports and passages in the body of said rotary valve and thence to said cylinders, said reversing valve having means for manually effecting its partial rotation to effect a transposition of said intake and exhaust ports acting through the rotary valve to reverse the motor, the ports and passages of said rotary valve being coordinated for direct association with the ports of said cylinders, a central longitudinal drive shaft journaled in alignment with the axis of said rotary valve and adapted to actuate said rotary valve, a crank shaft for each piston operatively connected to be rotated thereby, transmission means contiguous said drive shaft and in operative association therewith, said transmission means being integrally associated with said crank shafts and actuated thereby, said cylinders being diagonally disposed around the axis of said drive shaft with their axes converging toward said rotary valve, and said crank shafts being radially disposed around said drive shaft axis in planes normal to the axes of their respective cylinders.

4. In a pressure fluid actuated motor, the combination of a cylinder block having a plurality of cylinders and pistons reciprocable therein, a cylindrical rotary valve mounted in said block contiguous the heads of the cylinders for directly supplying said fluid and exhausting the same from said cylinders, and adapted for timing the operation of said pistons in predetermined sequence, a head member mounted on said cylinder block having a bore transversely therethrough, a motor reversing valve mounted in said bore adjacent said rotary valve, said head member having intake and exhaust ports leading through said reversing valve and coordinated with ports and passages in the body of said rotary valve, said cylinder block having cylinder ports leading from said cylinders directly to said rotary valve, said reversing valve having means for effecting its rotation to cause a transposition of said intake and exhaust ports acting through the rotary valve to reverse the motor, the ports and passages of said rotary valve being coordinated for direct association with said cylinder ports, a bearing supporting frame member upon which said block is mounted including means adaptable for supporting said motor, a central longitudinal drive shaft journaled in alignment with the axis of said rotary valve in bearings carried by said frame member at opposite ends thereof, said rotary valve being adapted for actuation by and integrally with said drive shaft, a crank shaft for each piston operatively connected to be rotated thereby, transmission means contiguous said drive shaft and adapted to actuate the same, said transmission means being integrally associated with and actuated by said crank shafts, the latter being journaled respectively in bearings carried by said frame member, said cylinders being diagonally disposed around the axis of said drive shaft with their axes converging toward said rotary valve, and said crank shafts being radially disposed around said drive shaft axis in planes normal to the axes of their respective cylinders.

5. In a pressure fluid actuated motor or compressor, the combination of a plurality of cylinders and pistons reciprocable therein, a cylindrical rotary valve mounted in direct contiguity to the heads of the cylinders and having fluid supply and exhaust ports and passages for directly supplying said fluid to and exhausting the same from correlated parts of said cylinders, and adapted for timing the operation of said pistons in predetermined sequence, a head member having suitable intake and exhaust ports coordinated with said rotary valve, a central longitudinal drive shaft journaled in alignment with and prolongation of the axis of said rotary valve and adapted to actuate the same, a crank shaft for each piston operatively connected to be rotated thereby when operating as a motor and for actuating the respective pistons when operating as a compressor, transmission means integrally attached to said crank shafts and contiguously positioned relative to said drive shaft for rotating the same when functioning as a motor and conversely said transmission means being actuated by said drive shaft when functioning as a compressor, said cylinders being diagonally disposed around the axis of said drive shaft with their axes converging toward said rotary valve, and said crank shafts being radially disposed around said drive shaft axis in planes normal to the axes of their respective cylinders.

6. In a pressure fluid actuated motor or compressor, the combination comprising a longitudinally mounted drive shaft, a plurality of cylinders substantially longitudinally positioned around said drive shaft and angularly disposed relative thereto, pistons reciprocable in said cylinders, transmission means positioned between the longitudinal axes of said cylinders and said shaft in operative association with the latter, said pistons being coordinated with said transmission means for actuating the same when functioning as a motor and for being actuated thereby when functioning as a compressor, means for supplying fluid to and exhausting the same from said cylinders comprising a rotary valve mounted for integral movement with said shaft, said rotary valve being positioned contiguous the heads of said cylinders for directly supplying and exhausting fluid thereto and therefrom in timed sequence.

7. In a pressure fluid actuated motor or compressor, the combination comprising a cylinder block having a central longitudinally mounted drive shaft, a plurality of cylinders substantially longitudinally positioned around said drive shaft and angularly disposed relative thereto, pistons reciprocable in said cylinders, a gear type transmission means positioned between the longitudinal axes of said cylinders and said shaft in operative association with the latter, said pistons being adapted for actuating said shaft through said transmission means when the combination functions as a motor and for being actuated by said shaft when functioning as a compressor, means for conducting high and low pressure fluids to and from said cylinders comprising a cylindrical rotary valve mounted in said block for integral movement with and actuation by said shaft and positioned in direct contiguity with the heads of said cylinders for directly supplying and exhausting said fluid from the cylinders, said valve having ports and passageways coordinated with said cylinders for timing the operation of said pistons in predetermined sequence.

8. In a pressure fluid motor or compressor, the combination comprising a plurality of cylinders and pistons reciprocable therein, a rotary valve for timing the operation of said pistons in predetermined sequence, said valve being contiguous the cylinder heads and having fluid supply and exhaust ports and passages for directly conducting high and lower pressure fluids to and from said cylinders, a longitudinal drive shaft integrally attached to said rotary valve for actuating the same, said cylinders being substantially longitudinally positioned about said drive shaft and angularly disposed relative thereto, a crank shaft connected to each piston and operatively associated with said drive shaft for actuating said shaft when functioning as a motor and for being actuated by said shaft when functioning as a compressor, said crank shafts being substantially radially disposed around said drive shaft in planes substantially perpendicular to the axes of their respective cylinders.

9. In a pressure fluid motor or compressor, the combination comprising a plurality of cylinders and pistons reciprocable therein, a rotary valve for timing the operation of said pistons in predetermined sequence, said valve being contiguous the cylinder heads and having fluid supply and exhaust ports and passages for directly supplying fluid to and exhausting the same from said cylinders, a longitudinal drive shaft integrally attached to said rotary valve for actuating the same, said cylinders being substantially longitudinally positioned about said drive shaft and angularly disposed relative thereto, a crank shaft connected to each piston and operatively associated with said drive shaft for actuating said shaft when functioning as a motor and for being actuated by said shaft when functioning as a compressor, said crank shafts being substantially radially disposed around said drive shaft in planes substantially perpendicular to the axes of their respective cylinders, and a reversing valve for controlling the direction of rotation of said drive shaft when the combination operates as a motor and determining the outlet as a compressor, said reversing valve comprising a head member contiguous the rotary valve and having ports and passages for conducting high and low pressure fluids to and from said rotary valve.

10. In a pressure fluid actuated motor or compressor, the combination comprising a drive shaft, a plurality of cylinders substantially longitudinally positioned around said drive shaft, pistons reciprocable in said cylinders, means for conducting high and low pressure fluids to and from said cylinders comprising a rotary valve mounted for integral movement with and actuation by said shaft, said cylinders being angularly disposed relative to said shaft and converging toward said rotary valve, said valve being positioned contiguous the cylinders and having ports and passages coordinated with the inlet and outlet ports of said cylinders substantially without intervening conduits, and transmission means positioned between said drive shaft and the longitudinal axes of said cylinders in operative association with said shaft and said pistons, said pistons being adapted for actuating said shaft through said transmission means when the combination functions as a motor and for being actuated by said shaft when functioning as a compressor.

11. In a pressure fluid actuated motor or compressor, the combination comprising a drive shaft, a plurality of cylinders substantially longitudinally positioned around said drive shaft, pistons reciprocable in said cylinders, means for conducting high and low pressure fluids to and from said cylinders comprising a rotary valve mounted for integral movement with and actuation by said shaft, said cylinders being angularly disposed relative to said shaft and converging toward said rotary valve, said valve being positioned contiguous the cylinders and having ports and passages coordinated with the inlet and outlet ports of said cylinders substantially without intervening conduits, transmission means positioned between said drive shaft and the longitudinal axes of said cylinders in operative association with said shaft and said pistons, said pistons being adapted for actuating said shaft through said transmission means when the combination functions as a motor and for being actuated by said shaft when functioning as a compressor, and a reversing valve coordinated with said rotary valve for controlling the direction of rotation of said shaft.

LESTER SEJARTO.

REFERENCES CITED

The following references are of record in the file of this patent:

UNITED STATES PATENTS

| Number | Name | Date |
|---|---|---|
| 165,139 | West | June 29, 1875 |
| 198,535 | Davies | Dec. 25, 1877 |
| 672,263 | Dean | Apr. 16, 1901 |
| 820,345 | Brousseau | May 8, 1906 |
| 199,978 | Holub | Feb. 5, 1878 |
| 424,183 | Dennis et al. | Mar. 25, 1890 |
| 1,804,921 | Ellyson | May 12, 1931 |
| 790,969 | McCarroll | May 30, 1905 |
| 2,350,377 | Tjaarda | June 6, 1944 |
| 776,336 | Mainland | Nov. 29, 1904 |
| 633,192 | Halsey | Sept. 19, 1899 |
| 666,690 | Pickles | Jan. 29, 1901 |
| 2,246,074 | Joy | June 17, 1941 |
| 2,192,539 | Condon | Mar. 5, 1940 |
| 2,292,125 | Ifield | Aug. 4, 1942 |
| 1,996,789 | Baker | Apr. 9, 1935 |